REDISTRIBUTION OF ORGANOSILANES

Harry R. McEntee, Waterford, N.Y., assignor to General Electric Company, a corporation of New York No Drawing. Application July 13, 1955
Serial No. 521,889

8 Claims. (Cl. 260—448.2)

This invention is concerned with a process for improving the catalytic activity of sodium chloroaluminate of reduced activity as a result of employing the latter in the reaction involving redistribution of organosilanes. More particularly, the invention relates to an improvement for reactivating sodium chloroaluminate employed as a redistribution catalyst in the reaction carried out at elevated temperatures between (1) a preformed compound corresponding to the general formula

$$(R)_m SiCl_{(4-m)}$$

and (2) a preformed compound corresponding to the general formula

$$(R')_n SiCl_{(4-n)}$$

where $m$ is a whole number equal to from 1 to 4, and $n$ is a whole number equal to from 0 to 3, where $m$ and $n$ are dissimilar, and R and R' are members selected from the class consisting of alkyl and aryl radicals and are preferably although not essentially the same, said improvement comprising passing aluminum chloride ($AlCl_3$) in combination with the organochlorosilane feed over the spent sodium chloroaluminate catalyst.

In the copending application of Ben A. Bluestein, Serial No. 308,719 filed September 9, 1952 (now U.S. Patent 2,717,257 issued September 6, 1953), and assigned to the same assignee as the present invention, there is disclosed and claimed a process for effecting the redistribution of organosilanes of the two above formulae at elevated temperatures employing as a catalyst for the reaction a metal halogenoaluminate of the formula $$MAlX_4$$

where M is an alkali metal, for example, sodium potassium and lithium, etc. and X is a halogen, for example, chlorine, bromine, fluorine, etc. A specific example of such a metal halogenoaluminate is sodium chloroaluminate. One advantage of using this sodium chloroaluminate over aluminum chloride previously employed in redistribution reactions is the ability to deposit the sodium chloroaluminate on an inert carrier and to carry out the redistribution reaction in the presence of this sodium chloroaluminate without undesirable losses due, for instance, to sublimation as occurs when using aluminum chloride. Unexpectedly, it has been discovered that although the sodium chloroaluminate can be employed for long periods of time as a catalyst, with the passage of time, the activity of the catalyst begins to diminish due apparently to a poisoning effect which takes place gradually as the redistribution of the organosilanes proceeds. Ultimately it is found that the catalyst activity of the sodium chloroaluminate has dropped to such a low level that it is no longer useful in this reaction and therefore a new catalyst must be prepared and deposited upon an inert carrier in the manner described in the above-identified Bluestein application.

Unexpectedly, I have discovered that one can reactivate the sodium chloroaluminate catalyst even though it has been poisoned to a large extent, by a relatively simple process of merely passing aluminum chloride, in combination with the organochlorosilanes being redistributed, over the deactivated sodium chloroaluminate for a sufficient time to regenerate the activity of the catalyst. After such treatment with the aluminum chloride, it will be found that the activity of the sodium chloroaluminate is essentially of the same order as when the catalyst was originally deposited on the inert carrier. This reactivation technique is possible because of the unexpected discovery that aluminum chloride is soluble (at room temperatures of about 25–35° C.) in both the feed composing the mixture of organochlorosilanes being subjected to redistribution and also is soluble in the redistributed reaction product, which product acts as a means for maintaining the aluminum chloride in solution and preventing its sublimation and subsequent tendency to fouling.

The inert carrier (or packing) upon which the sodium chloroaluminate may be deposited may comprise, for instance, porous Alundum, pumice, porous clay, etc. Several methods may be used to coat the carrier or packing with the sodium chloroaluminate, some of which are disclosed in the above-mentioned Bluestein application. In one instance the sodium chloroaluminate is heated to an elevated temperature and when thus liquified is intimately mixed with the carrier or packing so as to coat and impregnate the packing. Alternatively, the metallic aluminate may be dissolved in a suitable solvent, the packing added to the solution of the metallic aluminate and intimately mixed, and thereafter the solvent evaporated to leave the packing containing an intimate deposit of metallic aluminate. The procedure for applying the sodium chloroaluminate to the packing or inert carrier is not critical. The amount of sodium chloroaluminate used may be varied and when employed, for instance, at super-atmospheric pressures good results may be obtained when from 0.5 to 5%, by weight, of the sodium chloroaluminate based on the total weight of the reactants, namely, the organosilanes used for redistribution purposes are employed, is deposited on the inert carrier or packing. When conducting the reaction at normal pressures over the sodium chloroaluminate deposited on the carrier, the amount of sodium chloroaluminate used may be varied widely. Persons skilled in the art will appreciate that the amount of sodium chloroaluminate deposited should be sufficient to give adequate exposed surface to the reactants being passed over the surface of the catalyst.

The passage of the reactants over the sodium chloroaluminate is advantageously carried out at temperatures of the order of about 250° to 500° C. Temperatures can be varied widely depending upon such factors as time of contact of the reacting ingredients with the sodium chloroaluminate reactants used, amount of catalyst used, etc. The time for effecting the redistribution reaction may be varied within wide limits depending, for instance, on the temperature employed, the presence or absence of pressure, whether reaction is on a continuous or batch basis, the time of contact of the reaction mixture with the sodium chloroaluminate, etc.

With regard to other conditions for passage of the organosilane reactants over the sodium chloroaluminate deposited on the inert carrier or packing, attention is directed to the above-mentioned Bluestein application, which by reference is made part of the disclosures of the present application.

After it has been determined that the activity of the sodium chloroaluminate is beginning to fall, the method for reactivation is relatively simple. The sodium chloroaluminate deposited on the inert carrier or packing is then maintained in its regular position as a reacting mass, and aluminum chloride is advantageously dissolved in the organochlorosilane feed, and this heated mixture is passed in the vapor phase over the deactivated sodium chloroaluminate. After the desired level of reactivity is generated, the incorporation in the feed of the aluminum chloride can be discontinued, although some advantages are obtained by continuing the concurrent passage of the $AlCl_3$. The time within which this passage of the aluminum chloride may take place may be varied widely as will be apparent to those skilled in art. Factors to be considered will be the amount of sodium chloroaluminate employed, type of carrier, the degree to which deactivation of the sodium chloroaluminate has occurred, etc. In general, the aluminum chloride may be employed in amounts ranging from about 0.5% to 10% or more, preferably about 1 to 5%, by weight, based on the total weight of the mixture of organosilanes being subjected to redistribution.

Thus, by employing, for instance, from about 0.5 to 10% aluminum chloride in the same feed with, for instance, methyltrichlorosilane and trimethylchlorosilane passed over the sodium chloroaluminate, it will be found that the sodium chloroaluminate is rapidly regenerated and shortly thereafter the aluminum chloride passage can be stopped (or it can be continued if desired), and it will be found that the catalyst will be sufficiently reactivated so that the redistribution reaction can be caused to take place at essentially the same rate as occurred with the fresh sodium chloroaluminate when first deposited on the inert carrier.

The regeneration of the sodium chloroaluminate is particularly applicable in continuous flow systems whereby the mixtures of the organosilanes being redistributed are passed over the sodium chloroaluminate deposited on the inert carrier, and the redistributed products are withdrawn on a continuous basis.

In order that those skilled in the art may better understand how the present invention may be practiced, the following examples are given by way of illustration and not by way of limitation. All parts are by weight.

EXAMPLE 1

The catalyst-carrier mass was prepared by making a saturated sodium chloride aqueous solution (about 35 parts NaCl per 100 parts $H_2O$) at around 28° C., soaking 1000 parts Alundum ($Al_2O_3$) spheres ¼″ in diameter in the salt solution, decanting off the excess salt solution, and drying at 150° C. the coated and impregnated spheres. The salt-treated spheres were sealed in a steel reactor tube (hereinafter described) with an amount of anhydrous $AlCl_3$ equal in molar concentration to the NaCl deposited on the Alundum and the tube heated at about 475° C. for about 24 hours until the sodium chloroaluminate had formed in situ. Thereafter, equimolar quantities of trimethylchlorosilane and methyltrichlorosilane were passed over the sodium chloroaluminate catalyst mass maintained at a temperature of about 470° C. for varying lengths of time. This passage was continued until reduction in activity of the sodium chloroaluminate became evident because the percent of dimethyldichlorosilane in the reaction product dropped to less than 50 weight percent for a residence time of 2 minutes, and less than 30 weight percent for a residence time of 1 minute. The residence time is defined as the ratio of the free space in the reaction bed to the volumetric gas rate at the reaction conditions. The reactor used was a steel tube 2″ in diameter and about 18″ long. All these operations were carried out at atmospheric pressure of about 760 mm. Thereafter, reactivation of the catalyst was carried out by adding various amounts of anhydrous aluminum trichloride to the feed composed of equimolar concentrations of methyltrichlorosilane and trimethylchlorosilane, and this mixture of methylchlorosilanes together with the aluminum chloride was again passed over the sodium chloroaluminate for varying lengths of time at 470° C. As a result of adding 3% by weight aluminum chloride to the feed of the equimolar concentration of methyltrichlorosilane and trimethylchlorosilane, it was found that, whereas prior to the passage of aluminum trichloride, the conversion to dimethyldichlorosilane at one minute residence was 30%, at the same one minute residence time with the 3% aluminum trichloride present, the conversion of dimethyldichlorosilane was increased to about 70.5%. In the same manner, where the sodium chloroaluminate was in a state of reduced activity as a result of a continuous operation, for a 2.3 minute residence time, it showed a conversion of 50% dimethyldichlorosilane. By adding 3% aluminum trichloride to the feed of the methyltrichlorosilane and trimethylchlorosilane, the conversion of the dimethyldichlorosilane at the 2.3 minute residence time was increased to about 65%. When the feed containing the 3% $AlCl_3$ was discontinued after about 10 hours, and the feed without the $AlCl_3$ allowed to be fed into the contact mass, the activity of the sodium chloroaluminate remained at a high level as evidenced by the fact that at a residence time of about 0.8 to 1.1 minutes the $(CH_3)_2SiCl_2$ conversion averaged about 42% after about 10,000 grams of feed [mixture of $CH_3SiCl_3$ and $(CH_3)_3SiCl$] at a feed rate of about 50–60 grams per hour.

EXAMPLE 2

In this example, using the sodium chloroaluminate as described in Example 1 deposited on the inert Alundum sphere packing and employing the same procedure and conditions (including apparatus) as in Example 1, a 500-hour sustained run was carried out at 470° C. and 100 pounds gauge pressure, using an equimolar mixture of methyltrichlorosilane and trimethylchlorosilane. During this run various amounts of aluminum trichloride were incorporated (by dissolving) in the feed of methyltrichlorosilane and trimethylchlorosilane. Duration of the flow of the various feed-aluminum chloride concentrations was maintained until an equilibrium had been obtained. The percentage of dimethyldichlorosilane in the reaction product as a function of the aluminum chloride content of the feed is shown below for two residence times.

Table 1

| Percent $AlCl_3$ in Feed | Percent $(CH_3)_2SiCl_2$ in Reaction Product—Residence Time | |
|---|---|---|
| | 2.5 Minute | 5.0 Minutes |
| 0 | | (*) |
| 0.3 | | 30 |
| 0.6 | 38 | 49 |
| 0.75 | 36 | 61 |
| 1.0 | 40 | 64 |
| 1.5 | 47 | 68 |
| | 58 | 70 |

(Maximum equilibrium conditions are 70–75% conversion to dimethyldichlorosilane.)
*After 50 hours of passage of feed.

It will, of course, be apparent to those skilled in the art that other means for reactivating the sodium chloroaluminate catalysts may be employed in addition to that whereby the aluminum chloride regenerating material is passed simultaneously with the feed of the organosilanes being caused to redistribute. Thus, the aluminum chloride may be passed over the sodium chloroaluminate on the inert carrier prior to again passing the organochlorosilane feed over the reactivated catalyst.

It should be understood that other conditions of reaction may be employed (many of which are described in the above-mentioned Bluestein application) in which the aluminum chloride is passed simultaneously with the feed. Thus, different temperatures, pressures, molar concentrations of the organosilanes, varying concentrations of aluminum trichloride, rates of passage of the ingredients, etc., may be used without departing from the scope of the invention. Also, the type of inert carrier may be varied and carriers other than $Al_2O_3$ may be used.

Among the compounds embraced by the aforementioned general formulas $$(R)_m SiCl_{(4-m)}$$

and $$(R')_n SiCl_{(4-n)}$$

are, for instance, silicon tetrachloride, tetramethylsilane, tetraethylsilane, methyltrichlorosilane, ethyltrichlorosilane, phenyltrichlorosilane, butyltrichlorosilane, dimethyldichlorosilane, trimethylchlorosilane, diphenyldichlorosilane, tolyltrichlorosilane, diethyldichlorosilane, triethylchlorosilane, dipropyldichlorosilane, di-isopropyldichlorosilane, triphenylchlorosilane, dibutyldichlorosilane, tri-isobutylchlorosilane, amyltrichlorosilane, lauryltrichlorosilane, etc. Where mixtures of organochlorosilanes are employed, it is desirable that the organic groups attached to the silicon atom be the same in order to facilitate ease of separation of the products. Good results may also be obtained by employing the metallic aluminate to effect redistribution of mixtures of phenyl silanes, either alone or with alkyl silanes, for example, mixtures of phenyl chlorosilanes and alkyl chlorosilanes. Mixtures of alkyl or aryl halogenosilanes or mixtures of inorganic halogenosilanes (free of silicon-bonded hydrogen) with organochlorosilanes, or mixtures of inorganic chlorosilanes with tetra-alkyl or tetra-aryl silanes, or mixtures of alkyl chlorosilanes and tetra-alkyl silanes, etc., are among the additional combination of ingredients which may be employed in the practice of the present invention.

The mixtures of silanes may comprise, for instance, methyltrichlorosilane and trimethylchlorosilane, trimethylchlorosilane and silicon tetrachloride, silicon tetrachloride and tetramethylsilane, tetramethylsilane and methyltrichlorosilane, dimethyldichlorosilane and silicon tetrachloride, trimethylchlorosilane and triphenylchlorosilane, dimethyldichlorosilane and diphenyldichlorosilane, diethyldichlorosilane and tetraethylsilane, tetramethylsilane and tetraethylsilane, etc. Obviously, other alkyl or aryl groups may be attached to silicon atoms by carbon-silicon linkages.

The use of pressure equipment for conducting the reaction under super atmospheric pressure (either by batch or continuous processing) in the redistribution of the organosilanes may advantageously be carried out by heating the reaction mixture at the required temperature so that the internal pressure varies from above atmospheric pressure to about 2000 to 3000 p.s.i. The ratio of reaction ingredients employed may be varied widely within broad limits depending on the source of the reaction mixtures, the products available for reaction, the desired reaction product, etc. The ratio of the reactants, namely, the organosilanes will determine the amounts and types of products obtained as a result of carrying out the distribution reaction.

Thus, when equal molar concentrations of methyltrichlorosilane and trimethylchlorosilane are interacted, there will be obtained a mixture of methyltrichlorosilane, trimethyltrichlorosilane and dimethyldichlorosilane in which dimethyldichlorosilane will comprise a predominant proportion of the total weight of these three ingredients, provided equilibrium conditions have been attained. Obviously, if less than molar equivalents of methyltrichlorosilane and trimethylchlorosilane are employed, the amount of dimethyldichlorosilane will be reduced. Again, in, for instance, the reaction between silicon tetrachloride and tetramethylsilane, if one employs one mol of each of these two ingredients, one will obtain under equilibrium conditions a large amount of dimethyldichlorosilane which is in a predominant proportion together with small amounts of methyltrichlorosilane and trimethylchlorosilane, as well as unreacted silicon tetrachloride and tetramethylsilane. However, if one should employ one mol of silicon tetrachloride with three mols of tetramethylsilane, the predominant product will then be trimethylchlorosilane, and if one employs three mols of silicon tetrachloride and one mol of tetramethylsilane, the predominant product will be methyltrichlorosilane. It is thus apparent that the predominant product obtained in the reaction will be determined by the ratio of starting ingredients, that is, the ratio of organic groups to chlorine atoms in the individual compositions comprising the starting mixture.

The herein described and claimed improvement for reactivating the sodium chloroaluminate catalyst employed in the redistribution reaction of organosilanes, for instance, the redistribution of trimethylchlorosilane and either methyltrichlorosilane or silicon tetrachloride, to give dimethyldichlorosilane, leads to improved and more economical processing whereby one obtains increased yields of the redistributed reaction product, for instance, dimethyldichlorosilane, which is generally a more desirable and more useful material than any of the other ingredients used in the redistribution reaction. Thus, taking the dimethyldichlorosilane obtained from the reaction of trimethylchlorosilane and methyltrichlorosilane, the dimethyldichlorosilane can be hydrolyzed with water to give cyclic polymers, for instance, octamethylcyclotetrasiloxane. The octamethylcyclotetrasiloxane can be condensed with small amounts of potassium hydroxide to give silicone gums which when combined with fillers, such as silica aerogel and curing agents such as benzoyl peroxide can be heated at elevated temperatures and pressures to give molded articles, for instance, gaskets, grommets, etc., which have good high temperature resistance at temperatures of 150° to 250° C. for long periods of time, while at the same time remaining flexible at temperatures as low as —50 to —75° C.

The redistribution can also be applied to the separation of azeotropic mixtures of silicon tetrachloride and trimethylchlorosilane obtained as a result of the direct reaction of silicon and methyl chloride in accordance with the process described and claimed in Rochow Patent 2,380,995 issued August 7, 1945. The conversion of this azeotrope to the more desirable dimethyldichlorosilane is one of the objectives of the redistribution process.

What I claim as new and desire to secure by Letters Patent of the United States is:

1. In the process involving the redistribution reaction at a temperature of about 250° C. to 500° C. between (1) a preformed compound corresponding to the general formula $$(R)_m SiCl_{(4-m)}$$

and (2) a preformed compound corresponding to the general formula $$(R')_n SiCl_{(4-n)}$$

where $m$ is a whole number equal to from 1 to 4, $n$ is a whole number equal to from 0 to 3 where $m$ and $n$ are dissimilar, and R and R' are members selected from the class consisting of alkyl and aryl radicals, the aforesaid reaction being carried out in the presence of sodium chloroaluminate as a redistribution catalyst, the improvement in such process for regenerating the activity of the spent sodium chloroaluminate catalyst which comprises passing over the spent sodium chloroaluminate, anhydrous aluminum trichloride dissolved in the feed of the above two chlorosilanes being subjected to redistribution.

2. In the process involving the redistribution reaction at a temperature of about 250° C. to 500° C. in the presence of sodium chloroaluminate as a redistribution catalyst, between trimethylchlorosilane and methyltrichlorosilane, the improvement in such process for regenerating the activity of the spent sodium chloroaluminate catalyst which comprises passing over the sodium chloroaluminate, anhydrous aluminum trichloride dissolved in the feed of the trimethylchlorosilane and the methyltrichlorosilane.

3. In the process involving the redistribution reaction at a temperature of about 250° C. to about 500° C. in the presence of sodium chloroaluminate as a redistribution catalyst, between trimethylchlorosilane and silicon tetrachloride, the improvement in such process for regenerating the activity of the spent sodium chloroaluminate catalyst which comprises passing over the sodium chloroaluminate, anhydrous aluminum trichloride dissolved in the feed of the trimethylchlorosilane and the silison tetrachloride.

4. The process as in claim 2 in which the aluminum trichloride comprises from 0.5 to 10%, by weight, of the total weight of the methyltrichlorosilane and the trimethylchlorosilane.

5. The process as in claim 3 in which the aluminum trichloride is present in an amount equal to from 0.5 to 10%, by weight, based on the total weight of the trimethylchlorosilane and the silicon tetrachloride.

6. The process for reactivating the spent sodium chloroaluminate catalyst used in the redistribution reaction at elevated temperatures between a mixture of chlorosilanes comprising (1) a preformed compound corresponding to the general formula $$(R)_m SiCl_{(4-m)}$$

and (2) a preformed compound corresponding to the general formula $$(R')_n SiCl_{(4-n)}$$

where $m$ is a whole number equal to from 1 to 4, $n$ is a whole number equal to from 0 to 3, where $m$ and $n$ are dissimilar, and R and R' are members selected from the class consisting of alkyl and aryl radicals, which process comprises dissolving in the above-described mixture of chlorosilanes, from 0.5 to 10%, by weight, aluminum trichloride based on the total weight of the mixture of chlorosilanes, and thereafter passing the chlorosilane solution of aluminum trichloride over the sodium chloroaluminate deposited on an inert carrier while maintaining a temperature from 250 to 500° C. to effect redistribution of the organic groups and chlorine atoms in the mixture of chlorosilanes.

7. The process as in claim 6 in which the mixture of chlorosilanes is composed of trimethylchlorosilane and methyltrichlorosilane.

8. The process as in claim 6 in which the mixture of chlorosilanes is composed of trimethylchlorosilane and silicon tetrachloride.

References Cited in the file of this patent

UNITED STATES PATENTS

| | | |
|---|---|---|
| 2,655,484 | Groebe | Oct. 13, 1953 |
| 2,717,257 | Bluestein | Sept. 6, 1955 |

OTHER REFERENCES

Baud: "Comptes Rendus de l'Academie des Sciences," Paris, vol. 133 (1901), pp. 869–71.

Kendall et al.: "Am. Chem. Soc. Jour.," vol. 45, pages 963–966 (1923) (page 976 relied on).